United States Patent

Schlienger

[15] 3,683,094
[45] Aug. 8, 1972

[54] ARC POSITIONING SYSTEM FOR ROTATING ELECTRODE WHEEL ARC FURNACE

[72] Inventor: Max P. Schlienger, 19 Rollingwood Dr., San Rafael, Calif. 21301

[22] Filed: Feb. 18, 1971

[21] Appl. No.: 116,427

[52] U.S. Cl. ..............................13/9, 13/18, 13/26 S
[51] Int. Cl. ................................................H05b 7/08
[58] Field of Search..............................13/18, 9, 26 S

[56] References Cited

UNITED STATES PATENTS 3,461,214  8/1969  Schlienger.....................13/18
3,597,519  8/1971  Kemeny et al.................13/18

*Primary Examiner*—Roy N. Envall, Jr.
*Attorney*—Townsend and Townsend

[57] ABSTRACT

An arc furnace having a rotating electrode wheel that is rotated in a direction opposite from the direction of arc rotation caused by the magnetic field produced by the arc discharge. In this manner, the electrode wheel and arc will rotate in opposite directions to insure that the arc will originate from continually changing regions on the electrode wheel. According to a second embodiment, an electromagnet is disposed around the crucible and may be suitably energized to either produce stationery positioning of the arc with respect to the melt or counter-rotation of the arc with respect to the electrode wheel. In a third embodiment, a plurality of electromagnets are disposed around the crucible, the electromagnets being selectively energized to cause, due to magnetic repulsion, the arc to originate, under control, from varying regions of the melt.

5 Claims, 5 Drawing Figures

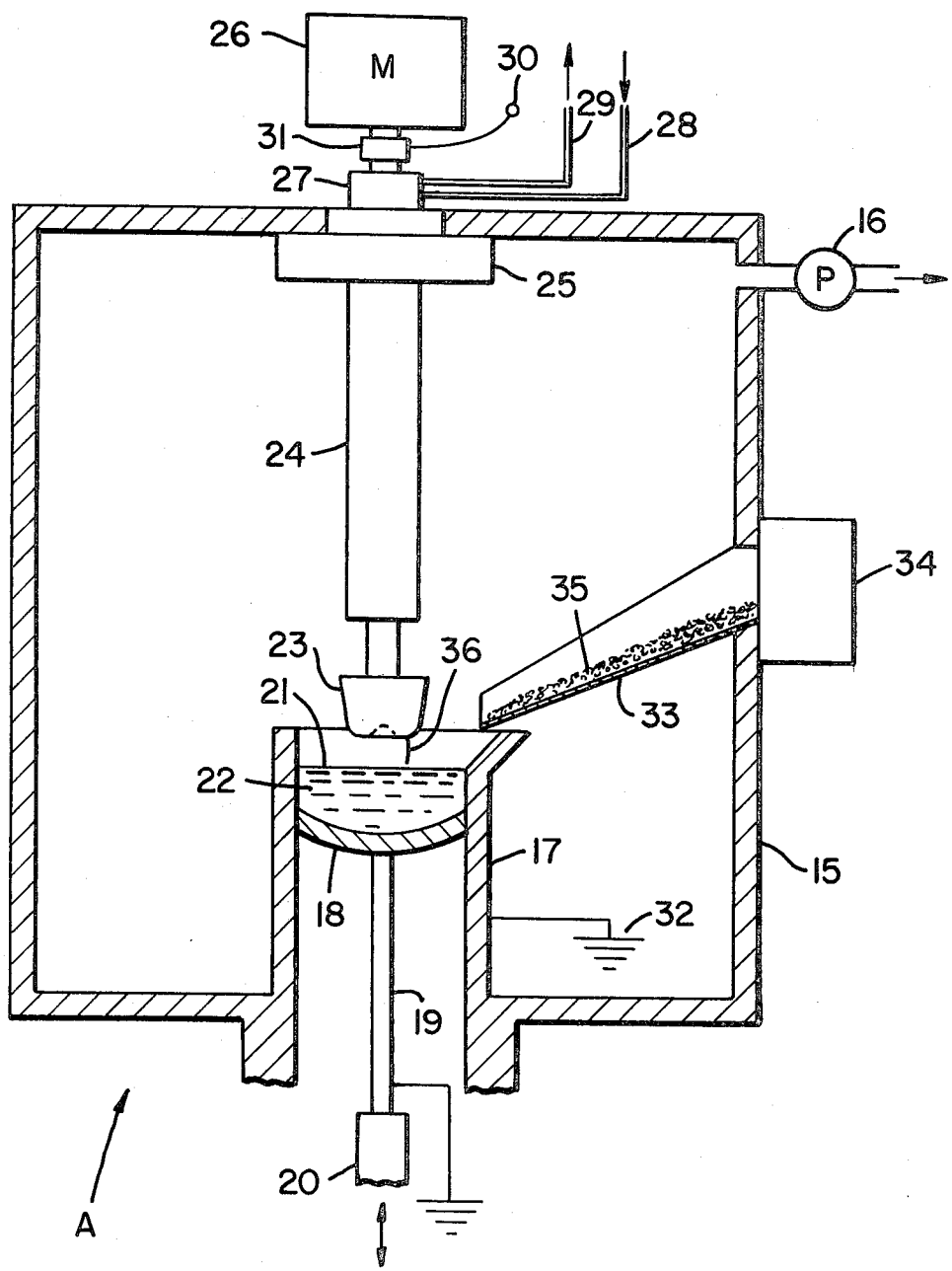
FIG_1

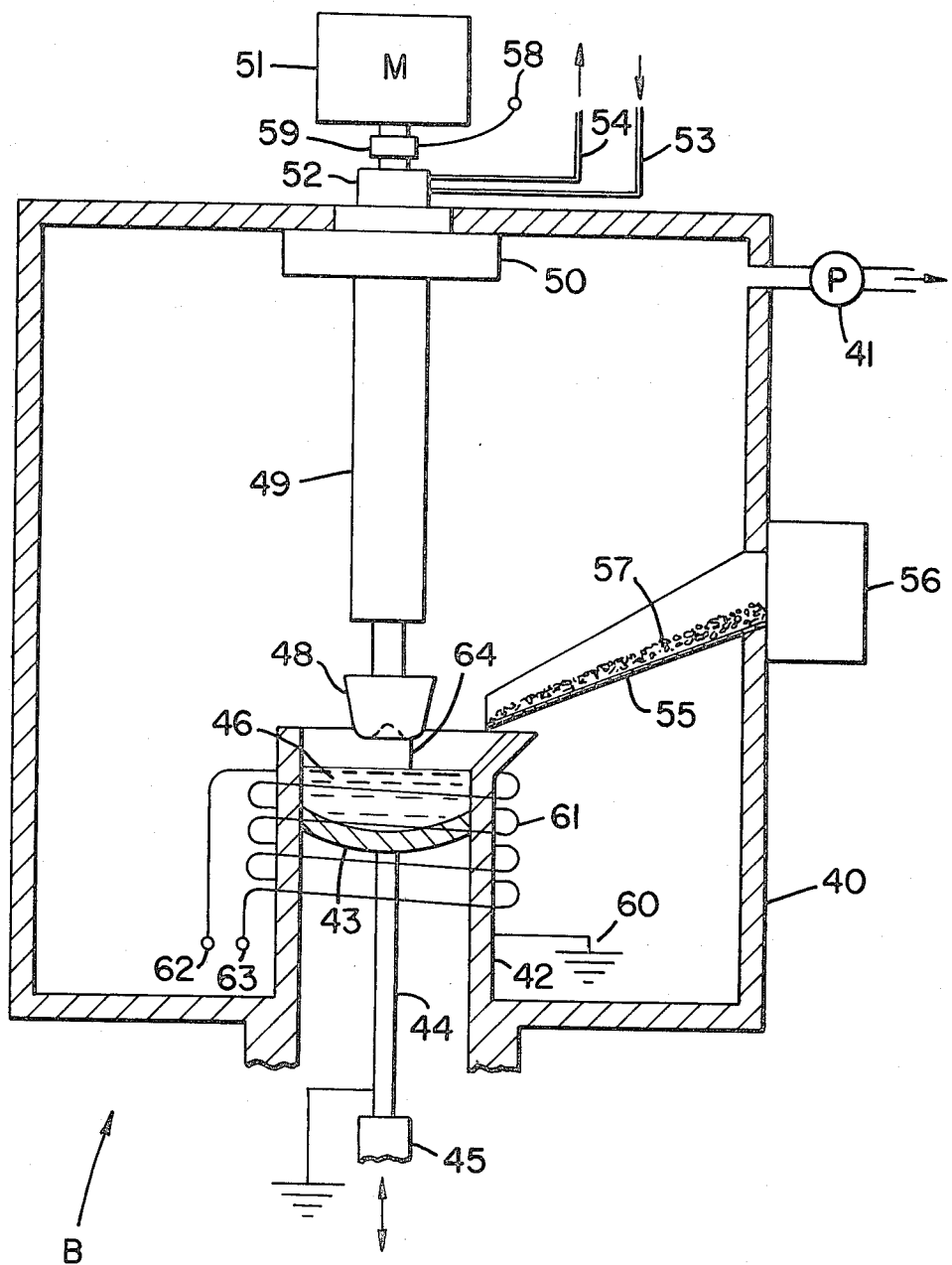
FIG_2

PATENTED AUG 8 1972
3,683,094
SHEET 3 OF 3
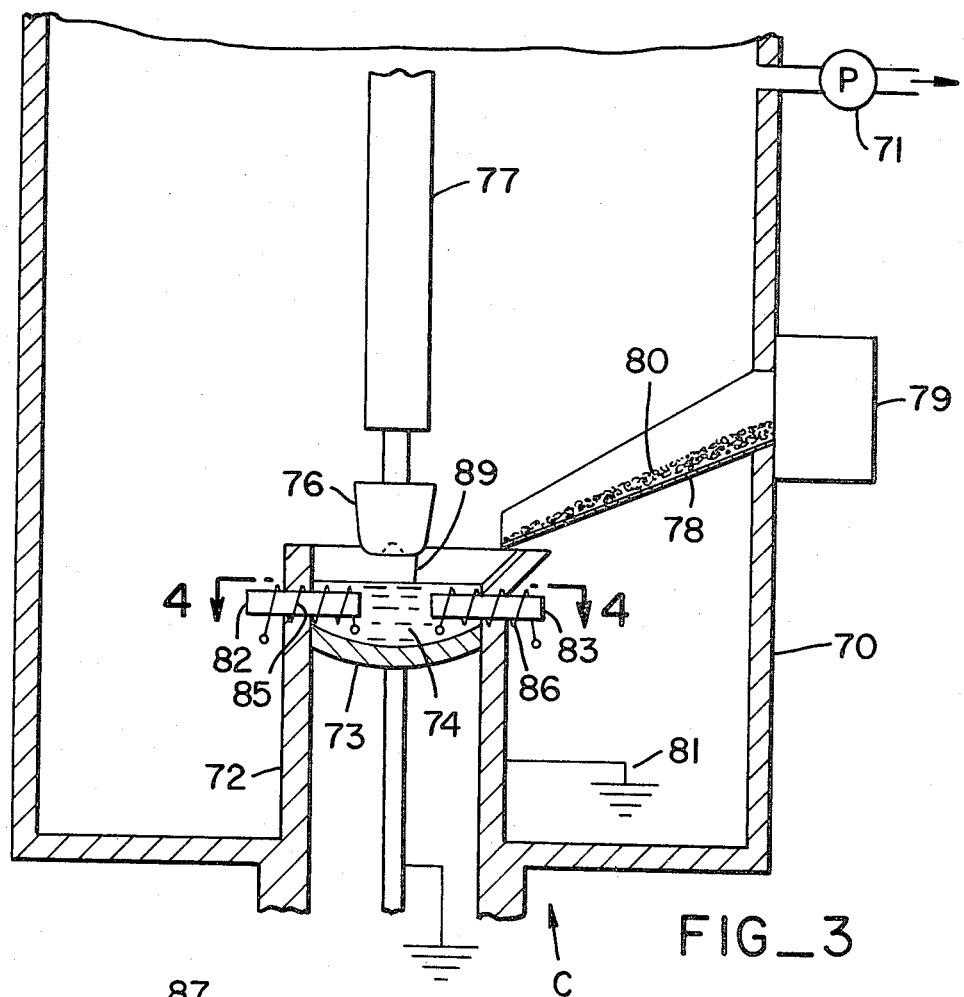
FIG_3
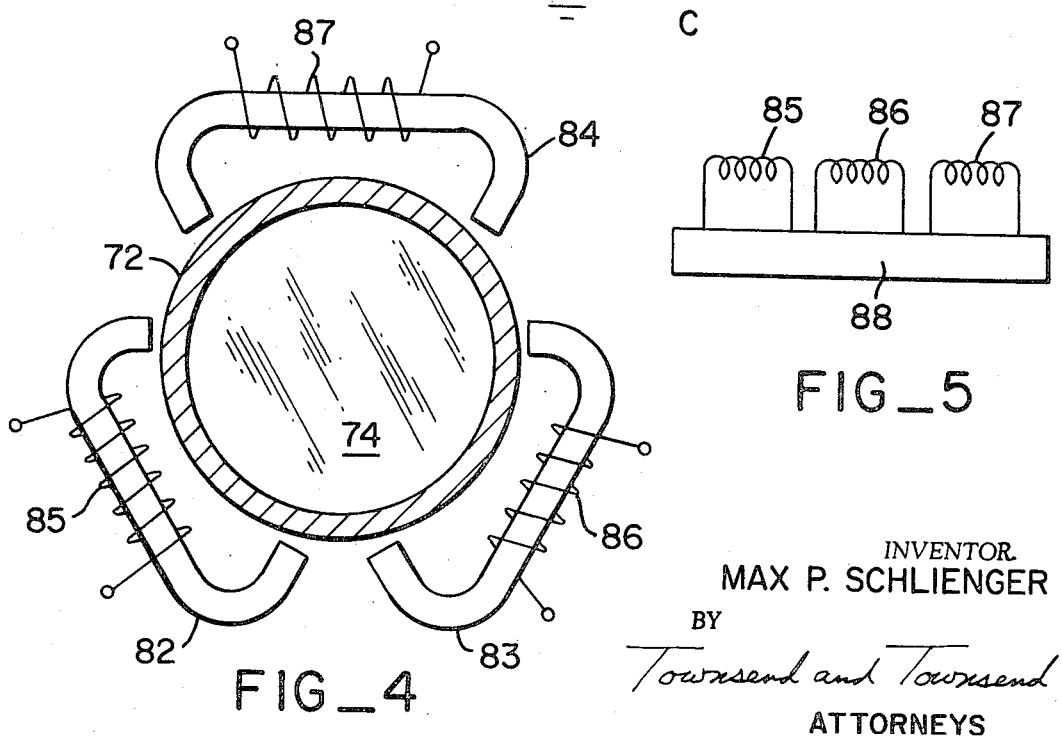
FIG_4
FIG_5
INVENTOR.
MAX P. SCHLIENGER
BY
Townsend and Townsend
ATTORNEYS

ARC POSITIONING SYSTEM FOR ROTATING ELECTRODE WHEEL ARC FURNACE

This invention relates to an arc positioning system for rotating electrode wheel arc furnaces.

Arc furnaces generally incorporate a melt and an electrode which is arranged to establish an arc to the melt in order to create a sufficient temperature gradient to melt materials within an evacuated or controlled atmosphere chamber. One commonly employed technique utilizes a previously molded, consumable electrode in which the electrode itself constitutes the material which is to be melted. This technique, however, requires that the work material be previously formed in an electrode shape. In other applications where scrap, powder, or sponge material is to be melted, a non-consumable electrode must be employed to create the requisite arc. Such non-consumable electrodes, when appropriately cooled, can function to provide the arc which maintains the melt at a sufficient temperature gradient to melt the powder or granular materials being added to the melt. However, the heat of the electrode tip causes severe erosion of the tip which in the case of higher temperature applications renders such a technique difficult. This is particularly true where refractory or reactive metals such as columbium, molybdinum, tungstun, zirconium, and titanium are to be treated.

According to applicant's prior inventions, disclosed in U.S. Pat. No. 3,420,939, issued Jan. 7, 1969, and U.S. Pat. No. 3,461,214, issued Aug. 12, 1969, these problems are substantially overcome by providing a novel wheel-shaped electrode mounted for rotation in proximity to the melt. While one or more arcs are established between the wheel and the melt, the wheel is rotated, causing the arcs to originate from changing portions of the surfaces of the rotating electrodes. Cooling is applied to the surface of the wheel to maintain the electrode at a sufficiently low temperature to allow high temperature arc-melting to occur without electrode destruction.

Applicant has found that when the electrode wheels according to his previous inventions are employed in arc furnaces, the high potential electrical discharge between the electrode wheel and the melt produces a magnetic field which, in turn, causes the arc to rotate. If the direction of rotation of the electrode wheel is the same as the direction of rotation of the arc produced by this magnetic field, the arc may appear to originate from a fixed location on the electrode wheel, causing the electrode wheel to deteriorate. This problem is particularly severe when the electrode wheel is mounted with its axis parallel to the axis of the crucible, and thus with the arc forming periphery of the electrode wheel equidistant from the upper surface of the melt, as disclosed in U.S. Pat. No. 3,420,939.

According to the present invention, applicant has found that the problem of electrode wheel deterioration due to arc rotation caused by the magnetic field produced by the arc may be substantially eliminated by rotating the electrode wheel in the direction opposite from the direction of the arc rotation produced by the inherent magnetic field thereof. In this manner, the arc may rotate due to the magnetic field, but such rotation will add to, not subtract from, the relative velocity of the electrode wheel with respect to the arc.

According to another embodiment of the present invention, an electromagnet coil may be provided around the crucible to create a magnetic field which will counteract the magnetic field inherent in the arc discharge. The electromagnetic coil may thus be suitably energized to preferably accomplish the positioning of the arc at a desired region of the melt or alternatively, to achieve counterrotation of the electrode wheel and the arc.

According to a third embodiment of the present invention, a plurality of electromagnets may be disposed around the perimeter of the melt, and suitable circuitry may be provided to selectively energize the electromagnets and thus provide a magnetic field in the melt, which, due to magnetic repulsion, causes the arc to originate, under control, from varying portions of the melt.

It is thus an object of the present invention to provide an arc furnace having an electrode wheel that is rotated in the direction opposite from the direction of arc rotation caused by the magnetic field produced by the arc discharge.

Another object of the present invention is to provide an arc furnace having a rotating electrode wheel in which an electromagnet is provided around the crucible to enable positioning of the arc at desired locations in the melt, or counter-rotation of the arc and electrode wheel.

Yet another object of the present invention is to provide an arc furnace having a rotating electrode wheel in which a plurality of electromagnets are disposed around the perimeter, the electromagnets being selectively energized to vary, under control, the region in the melt from which the arc originates.

These and other objects, features and advantages of the present invention will be more readily apparent from the following detailed description, with reference to the accompanying drawings, wherein:

FIG. 1 is a diagrammatic view showing an arc furnace incorporating a principal embodiment of the present invention;

FIG. 2 is a diagrammatic view, similar to FIG. 1, of an arc furnace incorporating another embodiment of the present invention;

FIG. 3 is a diagrammatic view, similar to FIG. 1, of an arc furnace incorporating still another embodiment of the present invention;

FIG. 4 is a sectional view, taken along the line 4—4 in FIG. 3; and

FIG. 5 is a block circuit diagram of the apparatus depicted in FIG. 3.

Referring initially to FIG. 1, there is provided an arc furnace A formed with an enclosure or housing 15 and having an evacuation pump mechanism 16 adapted to withdraw gas from the housing. By this means, the interior of housing 15 can be maintained under vacuum or protective atmosphere conditions, the exact pressure of which is determined by the materials to be worked on and the proposed purpose for their treatment.

A crucible cylinder 17 is vertically mounted in the interior of housing 15. A crucible bottom 18 is reciprocally mounted within cylinder 17. The crucible bottom 18 is supported by a shaft 19 and is drawn downwardly by a propulsion device 20, on demand. Thus, the upper surface 21 of melt 22 within crucible 18 can be maintained at a desired level simply by raising and lowering crucible bottom 18 by the propulsion device 20. As additional materials are fed into melt 22, the crucible bottom 18 is accordingly lowered, thereby holding the upper surface 21 of the melt 22 in its requisite position. The aforesaid melt-forming structure is common in the art and is illustrated herein for illustrative purposes only, it being understood that the invention can be combined with other forms of work supporting devices.

An electrode wheel 23 is mounted over melt 22 by a shaft 24, which is mounted in a bearing 25. Shaft 24 may be pivotally mounted in bearing 25 as disclosed in applicant's copending U.S. Patent Application entitled "Arc Furnace Electrode Wheel Mounting System", Ser. No. 55,869, filed July 17, 1970. Bearing 25 serves to support shaft 24 while electrically insulating shaft 24 from the housing 15. Shaft 24 extends through bearing 25 to the exterior of the housing 15. Shaft 24 is therein driven by a motor 26 mounted on the external end of the shaft. Thus, movement of the motor 26 causes rotation of shaft 24 and concurrent rotation of electrode wheel 23.

Water or other liquid coolant media is transmitted to, and exited from, electrode wheel 23 through a fluid or water intake manifold 27 mounted on shaft 24 externally of housing 15. This is accomplished through an inlet pipe 28 which is directed through manifold 27 into fluid communication through shaft 24 with electrode wheel 23. Exhaust is thence accomplished through shaft 24, manifold 27 and thence out an exhaust pipe 29. The water or other fluid supply system for handling the entry and exit are conduits 28 and 29, as well as motor 26, is maintained in electrical isolation from housing 15.

Materials to be melted can be fed into melt 22 by conventional means. One illustration of such is shown in FIG. 1, in which a chute 33 is fed materials through an air lock mechanism 34. The termination of chute 33 is arranged to drop work material, shown at 35, into crucible 18.

A source of high energy electrical power is provided at electrical terminal 30 and is connected by a coupling 31 to shaft 24 for transfer of the electrical energy to the conductive body of electrode wheel 23. The opposite pole of the aforesaid electrical energy is connected by ground 32 to cylinder 17, thereby establishing a ground polarity at melt 22. According to the present invention, the particular polarity of electrical power provided at electrical terminal 30 is dependent upon the direction of rotation of electrode wheel 23. Specifically, the polarity of electrical power applied to electrical terminal 30 is such that the magnetic field caused by the arc between electrode wheel 23 and melt 22 will tend to urge the arc in the direction opposite to the rotation of electrode wheel 23. Thus, if motor 26 is adapted to rotate electrode wheel 23 in a clockwise direction, the particular polarity of electrical power applied to terminal 30 should be such that the magnetic field produced by the arc urges the arc in the counterclockwise direction. If the electrode wheel is to be rotated in a counterclockwise direction, the opposite polarity of electrical power should be applied thereto. In this manner it is assured that the arc will be urged in the opposite direction from the rotation of the electrode wheel, so that the arc will preferably remain stationary with respect to the melt, or will counter-rotate with respect to the electrode wheel. This, in turn, will minimize electrode wheel deterioration by assuring that the arc will originate from continually changing portions of the electrode wheel.

Applicant has found that positive polarity electrical energy should be applied to terminal 30 when electrode wheel 23 is rotated in a clockwise direction as viewed from above, in order to urge the arc in the opposite direction from the rotation of the electrode wheel as described hereinbefore. Of course, negative polarity electrical energy should be applied to terminal 30 when electrode wheel 23 is rotated in a counter-clockwise direction as viewed from above.

In operation, work material 35 is fed into crucible 17 through the airlock valve 34. Pump 16 is actuated to maintain the interior of housing 15 at an appropriate vacuum period. Motor 26 is energized to rotate electrode wheel 23, and the appropriate polarity of electrical energy is applied to terminal 30, as described hereinbefore.

One or more arcs 36 will thus be developed from electrode wheel 23 to the top or upper surface 21 of melt 22. The arc, of course, raises the temperature to a level sufficient to cause the work material 35 to form the molten bath or melt 22. The rotation of electrode wheel 23, and the counterrotation of the arc 36, continually changes the area of the electrode wheel from which the arc emminates. Thus, while an arc is being formed from only a few degrees of the peripheral portion of electrode wheel 23, the entire peripheral portion thereof is cooled by the flow of coolant liquid there through. This causes a large area for heat dissipation and a small area for arc formation, thereby minimizing electrode wheel deterioration.

Referring now to FIG. 2, there is shown another embodiment of the arc positioning system according to the present invention. Specifically, there is provided an arc furnace B formed with an enclosure or housing 40 and having an evacuation pump mechanism 41 adapted to withdraw gas from the housing. A crucible cylinder 42 is vertically mounted in the interior of housing 40, and a crucible bottom 43 is reciprocally mounted within cylinder 42. Crucible bottom 43 is supported by a shaft 44 and is drawn downwardly by a propulsion device 45, on demand. Thus, a melt 46 may be contained within crucible 42, substantially in the same manner described with respect to the embodiment depicted in FIG. 1.

An electrode wheel 48 is mounted over melt 46 by a shaft 49, which is mounted in a bearing 50. Shaft 49 extends through bearing 50 to the exterior of housing 40. Shaft 49 is therein driven by a motor 51 mounted on the external end of the shaft. Thus, movement of the motor 51 causes rotation of shaft 49 and concurrent rotation of electrode wheel 48.

Water or other liquid coolant media is transmitted to, and exited from electrode wheel 48 through a fluid or water intake manifold 52 mounted on shaft 49 externally of housing 40. This is accomplished through an inlet pipe 53 and an exhaust pipe 54, substantially as described with respect to the embodiment depicted in FIG. 1.

Materials to be melted can be fed into melt 46 through an airlock mechanism 56. A chute 55 is arranged to drop work material, shown at 57, into crucible 42.

A source of high energy electrical power is provided at electrical terminal 58 and is connected by a coupling 59 to shaft 49 for transfer of the electrical energy to the conductive body of electrode wheel 48. The opposite pole of the aforesaid electrical energy is connected by ground 60 to cylinder 42, thereby establishing a ground polarity at melt 46.

An electromagnet coil 61 is disposed around crucible cylinder 42. A source of DC electrical energy may be connected to terminal 62 and 63 of coil 61 to produce a magnetic field within and above melt 46. The magnetic field thus produced will act upon the arc 64 generated between electrode wheel 48 and melt 46, tending to cause rotation of the arc. Since the arc produces an inherent magnetic field causing rotation thereof, as described in greater detail hereinbefore, the magnetic field produced by coil 61 may enhance or detract from this inherent field. Thus, by suitable selection of the polarities and amplitudes of electrical energy applied to terminals 62 and 63, the inherent field of the arc may be counteracted so as to achieve stationery positioning of the arc with respect to the melt. In this manner, the arc will originate from continually changing portions of electrode wheel 48, thus providing a large area for heat dissipation and a small area for arc formation. Accordingly, deterioration of electrode wheel 48 will be substantially minimized.

Alternatively, the amplitude and/or polarities of the electrical energy applied to terminal 62 and 63 may be varied to achieve any desired positioning or rotation of the arc between electrode wheel 48 and melt 46. Thus, counterrotation of the arc with respect to the rotation of electrode wheel 48 may be achieved.

The operation of arc furnace B depicted in FIG. 2 is substantially similar to the operation of the arc furnace depicted in FIG. 1. However, DC electrical energy may be applied to terminal 62 and 63 of coil 61 to achieve fixed positioning of the arc 64 with respect to the melt, as described hereinbefore.

Referring now to FIG. 3, there is shown another embodiment of the arc positioning system according to the present invention. Specifically, there is provided an arc furnace C formed with an enclosure or housing 70 and having an evacuation pump mechanism 71 adapted to withdraw gas from the housing. A crucible cylinder 72 is vertically mounted in the interior of housing 15, and a crucible bottom 73 is reciprocally mounted therein, to contain a melt 74 in a manner substantially identical to that described with respect to the embodiments of the present invention depicted in FIGS. 1 and 2.

An electrode wheel 76 is mounted over melt 74 by a shaft 77, in a manner similar to that described with respect to the embodiments of the present invention depicted in FIGS. 1 and 2. Similarly, materials to be melted can be fed into melt 74 by a chute 78 which is fed materials through an airlock mechanism 79. The termination of chute 78 is arranged to drop work materials shown at 80, into crucible 72.

A high energy source of electrical power is conducted via shaft 77 to electrode wheel 26. The opposite polarity of the aforesaid electrical energy source is connected by ground 81 to crucible 72, thereby establishing a ground polarity at melt 74.

Three electromagnet armatures 82, 83 and 84 are disposed around crucible cylinder 72. Referring particularly to FIG. 4, electromagnet armatures 82, 83 and 84 are disposed at approximately equidistant intervals around the perimeter of crucible 72. Each of the armatures 82, 83 and 84 are substantially C-shaped, having an elongate straight central portion. Electromagnet coils 85, 86 and 87 are wound around armatures 82, 83 and 84, respectively, to form three electromagnets.

Referring now to FIG. 5, electromagnet coils 85, 86 and 87 are connected to a selective source of DC electrical energy 88. Source 88 functions to apply DC voltage to any of the electromagnet coils 85, 86 or 87, on demand. In this manner, the operator of the arc furnace may, on demand, introduce a strong magnetic field into the interior of crucible cylinder 74. The magnetic field thus produced will tend to restrain the rotational movement of the arc 89 from electrode wheel 76 to melt 74, due to repulsion between this magnetic field and the inherent magnetic field produced by the arc 89. Thus, the arc will tend to remain stationery with respect to the melt 74, at a region removed from the magnetic field of the particular electromagnet 85, 86 or 87 energized.

In this manner, the operator may selectively energize electromagnet coils 85, 86 or 87 to achieve positioning of the arc at desired locations in the melt. Thus, the arc will remain stationery with respect to the melt and will originate from continually changing portions of electrode wheel 76, thereby providing a large area for heat dissipation and a small area for arc formation. This, in turn, will substantially minimize deterioration of electrode wheel 76. Furthermore, the operator of the arc furnace may periodically energize different ones of the electromagnets 85, 86 and 87 to thus achieve substantially uniform melt temperatures.

The operation of arc furnace C is substantially identical to the operation of the arc furnace as depicted in FIGS. 1 and 2. However, as referred to hereinbefore, by suitable energization of electromagnet coils 85, 86 and 87, the operator of the arc furnace may achieve desired fix positioning of the arc produced between electrode wheel 76 and melt 74.

Of course, the apparatus and procedures thus described may be suitably varied to suit the particular arc furnace configuration and work material to be employed. Specifically, while the subject invention is shown in combination in a furnace application for melting granular materials, it is to be understood that the arc positioning system thus described can be used with other types of furnace applications which are known in the art.

While particular embodiments of the present invention have been shown and described in detail, it is apparent that adaptations and modifications may be made without departing from the true spirit and scope of the present invention, as set forth in the claims.

What is claimed is:

1. In a melting and casting arc furnace of the type having an enclosed housing forming a controlled ambient atmosphere, a crucible mounted in said housing in which conductive meltable material is to be melted, a rotatably mounted non-consumable electrode wheel in which an arc is drawn between the electrode wheel and the conductive meltable material in the crucible and means rotating said electrode wheel, the improvement comprising: a plurality of electromagnets disposed around said crucible and means for selectively energizing said electromagnets.

2. Apparatus according to claim 1 wherein said electromagnets are oriented so that the magnetic fields of said electromagnets are directed into and above the meltable material in said crucible.

3. Apparatus according to claim 2 wherein said means for energizing said electromagnets is adapted to energize any desired one of said electromagnets on demand.

4. Apparatus according to claim 2 wherein said plurality of electromagnets comprises three electromagnets.

5. Apparatus according to claim 2 wherein each of said electromagnets comprises a substantially C-shaped armature and a coil disposed about said armature, said armature being disposed substantially parallel to the surface of the melt with the ends thereof adjacent said crucible.

* * * * *